(12) United States Patent
Nishimura et al.

(10) Patent No.: US 9,495,256 B2
(45) Date of Patent: Nov. 15, 2016

(54) APPARATUS AND METHOD FOR SWITCHING A PACKET

(75) Inventors: Kazuto Nishimura, Yokohama (JP); Hideo Abe, Oyama (JP); Satoshi Nemoto, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 448 days.

(21) Appl. No.: 13/595,224

(22) Filed: Aug. 27, 2012

(65) Prior Publication Data

US 2013/0077510 A1 Mar. 28, 2013

(30) Foreign Application Priority Data

Sep. 28, 2011 (JP) ................................ 2011-212915

(51) Int. Cl.
| | |
|---|---|
| *H04L 12/26* | (2006.01) |
| *G06F 11/20* | (2006.01) |
| *H04L 12/851* | (2013.01) |
| *H04L 12/64* | (2006.01) |
| *H04L 12/875* | (2013.01) |
| *H04L 12/863* | (2013.01) |

(Continued)

(52) U.S. Cl.
CPC ....... *G06F 11/2005* (2013.01); *H04L 12/6418* (2013.01); *H04L 47/24* (2013.01); *H04L 47/56* (2013.01); *H04L 47/6215* (2013.01); *H04L 49/15* (2013.01); *H04L 49/90* (2013.01)

(58) Field of Classification Search
CPC ................... H04L 145/28; H04L 47/10; H04L 2012/5635; H04L 2012/5681; H04L 47/11; H04L 47/263; H04L 12/5602; H04L 47/32; H04L 47/621; H04L 49/506; H04L 47/24

USPC ................... 370/252, 218, 390, 235; 710/52
See application file for complete search history.

(56) References Cited

U.S. PATENT DOCUMENTS

| | | | |
|---|---|---|---|
| 7,706,255 B1 * | 4/2010 | Kondrat | ........... H04L 47/10 370/219 |
| 8,363,549 B1 * | 1/2013 | Zhu et al. | ............ 370/235 |

(Continued)

FOREIGN PATENT DOCUMENTS

| | | |
|---|---|---|
| JP | 03-135135 | 6/1991 |
| JP | 05-056065 | 3/1993 |

(Continued)

*Primary Examiner* — Dang Ton
*Assistant Examiner* — Lionel Preval
(74) *Attorney, Agent, or Firm* — Staas & Halsey LLP

(57) ABSTRACT

An apparatus includes a first switch circuit in an active mode and a second switch circuit in a standby mode. The apparatus receives high-priority packets and low-priority packets. Each switch circuit stores the high-priority packets and the low-priority packets into first and second buffers, respectively. The each switch circuit performs packet-readout processing reading out a packet from the first and second buffers where the packet-readout processing is performed on the first buffer on a priority basis. The apparatus controls the first switch circuit so that a back-pressure time for the high-priority packets becomes longer with increasing amount of data transmitted by the high-priority packets, when a low-priority packet outputted from the first switch circuit is determined to be a packet that has been received at a first time that is later than a second time at which another low-priority packet outputted from the second switch circuit has been received.

6 Claims, 12 Drawing Sheets

(51) Int. Cl.
*H04L 12/933* (2013.01)
*H04L 12/861* (2013.01)

(56) References Cited

U.S. PATENT DOCUMENTS

| | | | | |
|---|---|---|---|---|
| 2001/0038607 | A1* | 11/2001 | Honda | H04L 49/153 370/218 |
| 2005/0138243 | A1* | 6/2005 | Tierney et al. | 710/52 |
| 2005/0243716 | A1* | 11/2005 | Bitar et al. | 370/218 |
| 2007/0041321 | A1* | 2/2007 | Sasaki | H04L 47/10 370/235 |
| 2009/0141720 | A1* | 6/2009 | Jung et al. | 370/390 |
| 2010/0074265 | A1 | 3/2010 | Masuya | |

FOREIGN PATENT DOCUMENTS

| | | |
|---|---|---|
| JP | 2009-212724 | 9/2009 |
| JP | 2010-074629 | 4/2010 |

* cited by examiner

FIG. 7

| PRIORITY | LATEST SEQUENCE NUMBER | | STATE |
|---|---|---|---|
| HIGH-PRIORITY | SW#0 | 7 | SYNCHRONOUS |
| | SW#1 | 7 | |
| LOW-PRIORITY | SW#0 | 20 | OUT-OF-SYNC |
| | SW#1 | 17 | |

FIG. 8

| | | INTENSITY |
|---|---|---|
| DATA RATIO OF CONTROL CLASS | 75% OR MORE | 20% CORRECTION |
| | LESS THAN 75% | 60% CORRECTION |

FIG. 12

|  |  | DIFFERENCE BETWEEN SEQUENCE NUMBERS | |
|---|---|---|---|
|  |  | LESS THAN 6 | 6 OR MORE |
| AVERAGE RATE OF CONTROL CLASS | 70% OR MORE | 10% CORRECTION | 30% CORRECTION |
|  | LESS THAN 70% | 50% CORRECTION | 70% CORRECTION |

APPARATUS AND METHOD FOR SWITCHING A PACKET

CROSS-REFERENCE TO RELATED APPLICATION

This application is based upon and claims the benefit of priority of the prior Japanese Patent Application No. 2011-212915, filed on Sep. 28, 2011, the entire contents of which are incorporated herein by reference.

FIELD

The embodiments discussed herein are related to an apparatus and method for switching a packet.

BACKGROUND

There is a case where packets are relayed by relay devices, or switches, from a packet transmission source device to a packet transmission destination device.

FIG. 1 is a diagram illustrating an example of a relay device. The relay device 1 depicted in FIG. 1 includes an administration module 2, interface cards 3 (3a to 3c), and switch circuits 4 (4a and 4b). The interface card 3 inputs and outputs user data. The switch circuit 4 performs switching according to a destination of a packet which is received from the interface card 3. That is, the switch circuit 4 selects an interface card 3 to which the packet is to be outputted, according to the destination of the received packet, and outputs the packet to the selected interface card 3. The administration module 2 administrates a state of the relay device 1 and outputs control information to the switch circuits 4 and the interface cards 3.

The relay device 1 depicted in FIG. 1 includes two sheets of switch circuits 4 so as to deal with a failure occurrence and planned replacement of devices. In the relay device 1 that uses a plurality of switch circuits 4 for redundancy as depicted in FIG. 1, the switch circuits 4 are synchronized with each other so that the working switch circuit 4 is switched, for example, in a case where a failure has occurred. However, the switch circuits 4 may lose synchronization among the switch circuits 4 due to various causes. For example, in a case where the switch circuits 4 respectively have their own clocks, even though the same frequency is set to all the clocks, difference in frequencies may be made among the switch circuits 4 due to deviation among the clocks.

FIGS. 2A and 2B are diagrams each illustrating an example of an operation when synchronization is lost between two switch circuits. In FIGS. 2A and 2B, synchronization has been lost between the switch circuit 4a and the switch circuit 4b. In both cases of FIGS. 2A and 2B, it is assumed that a clock frequency of the switch circuit 4a is higher than a clock frequency of the switch circuit 4b. Further, in FIGS. 2A and 2B, the interface cards 3a to 3c are each depicted redundantly on both the input (ingress) side and an output (egress) side for convenience of explanation. FIGS. 2A and 2B are depicted so as to facilitate visualization of the drawings, and interface cards 3 given the identical reference character are physically one interface card 3. For example, the interface cards 3a are depicted on both of the input side and the output side, but these interface cards 3a indicate physically one interface card 3a. Further, in FIGS. 2A and 2B, for convenience of explanation, packets are depicted with packet numbers indicating an order in which the packets are received by the relay device 1. Packets with the identical number indicate the same packet.

After the interface card 3a duplicates a received packet to obtain two packets, the interface card 3a outputs one packet to the switch circuit 4a and outputs the other packet to the switch circuit 4b. During a time period in which no congestion is occurring, even when processing in the switch circuit 4b is delayed compared to processing in the switch circuit 4a, the delayed processing of the switch circuit 4b is completed before a packet to be processed next is inputted into the switch circuit 4b. Therefore, packets to be processed by the switch circuit 4a and packets to be processed by the switch circuit 4b are the same packets, as depicted in FIG. 2A.

However, when congestion occurs, processing on a next packet is started in the switch circuit 4a before delay in processing in the switch circuit 4b is recovered. Therefore, when a congestion state is continuing, the timing of reading out packets from a buffer by the switch circuit 4a having a faster clock gradually precedes that by the switch circuit 4b, resulting in a state that packets to be processed in the switch circuit 4a and packets to be processed in the switch circuit 4b are different from each other. In the example of FIG. 2B, the switch circuit 4a outputs the 16th packet to the interface card 3a, while the switch circuit 4b outputs the 14th packet to the interface card 3a. When the switch circuit 4 in an active state is switched in such an asynchronous state, duplication or loss of a packet may occur. For example, in FIG. 2B, when the switch circuit 4a is active and is switched to the switch circuit 4b, a destination communication device receives the 14th and 15th packets from the switch circuit 4b. However, the destination communication device has already received the 14th and 15th packets which are switched by the switch circuit 4a. Accordingly, the destination communication device redundantly receives the 14th and 15th packets.

Meanwhile, it is assumed that the switch circuit 4b is active and is switched into the switch circuit 4a. In this case, output of the 14th and 15th packets from the switch circuit 4a has already been completed. Therefore, the switch circuit 4a does not transfer the 14th and 15th packets to the destination communication device after being set to be active, but the destination communication device has not received the 14th and 15th packets from the switch circuit 4b. Accordingly, loss of packets occurs in the destination communication device due to switching of the switch circuits.

In order to avoid such duplication or loss of data, an asynchronous transfer mode (ATM) exchange which synchronizes cell flows of redundant switches by using a test cell has been devised. This ATM exchange monitors cells inputted and inserts a test cell instead of a vacant cell when switching switches. The ATM exchange extracts a test cell from a cell outputted from a switch and acquires the output time of the test cell. When the output time of the test cell is different between switches, the ATM exchange performs control of causing a switch of which output time of a cell is earlier to delay output of a cell. Thereafter, when switches become synchronized, the ATM exchange switches the switches.

Further, as a related technique, such method has been devised that high-priority cells are inputted into a buffer provided for a switch of a standby operation system so as to avoid loss of the high-priority cells even when switches are switched due to a failure occurrence. Further, such method has been proposed that queue selection is performed for the number of stored cells which are stored in a buffer of a switching part of an active system so as to match a cell-storing state and a queue-selecting state of a switching part of the active system with those of a backup system. Further, such method has also been proposed in which voice processing blades share the reference timing and time information for voice processing, the voice processing is performed in synchronization with the reference timing to supply a synchronized packet, and system switching is performed in accordance with the time information.

Japanese Laid-open Patent Publication Nos. 5-56065, 3-135135, 2009-212724, and 2010-74629 are examples of related art.

SUMMARY

According to an aspect of the invention, an apparatus includes first and second switch circuits where one of the first and second switch circuits being in an active mode, and the other one of the first and second switch circuits is in a standby mode. The apparatus receives high-priority packets of a high-priority class and low-priority packets of a low-priority class. Each of the first and second switch circuits stores the high-priority packets and the low-priority packets into first and second buffers, respectively. Each switch circuit performs packet-readout processing for reading out a packet from the first and second buffers to output the packet outside the each switch circuit where the packet-readout processing is performed on the first buffer on a priority basis. The apparatus outputs the packet that has been outputted from one of the first and second switch circuits that is in the active mode. The apparatus controls a packet-readout time during which the packet-readout processing for each of the first and second switch circuits is performed. Under a condition that the first switch circuit is in the active mode and the second switch is in the standby mode, the apparatus controls the first switch circuit so that a back-pressure time during which the packet-readout processing on the high-priority class is stopped becomes longer with increasing amount of data transmitted by the high-priority packets, when a first time at which a first low-priority packet outputted from the first switch circuit has been received by the apparatus is later than a second time at which a second low-priority packet outputted from the second switch circuit has been received by the apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a table held by a comparison unit, according to an embodiment;

FIG. 8 is a diagram illustrating an example of a table held by a correction intensity determination unit, according to an embodiment;

FIG. 12 is a diagram illustrating an example of a table held by a correction intensity determination unit, according to a second embodiment.

DESCRIPTION OF EMBODIMENTS

A relay device which has been widespread in recent years may transmit and receive packets classified into a plurality of classes. However, in any of the method of synchronizing cell flows of redundant switches by using a test cell, the method of performing queue selection for the number of stored cells, and the method of sharing reference timing and time information of voice processing, transmission and reception of data classified into a plurality of classes are not taken into consideration. Accordingly, even if these techniques are applied to a relay device that transmits and receives packets classified into a plurality of classes, it may be difficult to synchronize a plurality of switch circuits that are in a state in which synchronization is lost. Hereinafter, the state in which synchronization is lost will be also expressed as "an out-of-sync state".

For example, it is assumed that a low-priority packet that is outputted from the switch circuit 4a at time T1 is delayed by one packet compared to a low-priority packet that is outputted from the switch circuit 4b at the same time T1 (an out-of-sync state). In this case, it is further assumed that an operation of the switch circuit 4b is stopped while the switch circuit 4a outputs one packet. However, when one high-priority packet is inputted into the switch circuit 4a during a time period in which the switch circuit 4b is being stopped, the switch circuit 4a outputs the one high-priority packet without performing processing on a low-priority packet. Therefore, the out-of-sync state is not resolved.

Further, even if the method of inputting a high-priority cell in a buffer provided for a switching part of a standby system is applied, it is difficult to resolve the out-of-sync state.

<Device Configuration>

Figure 3:
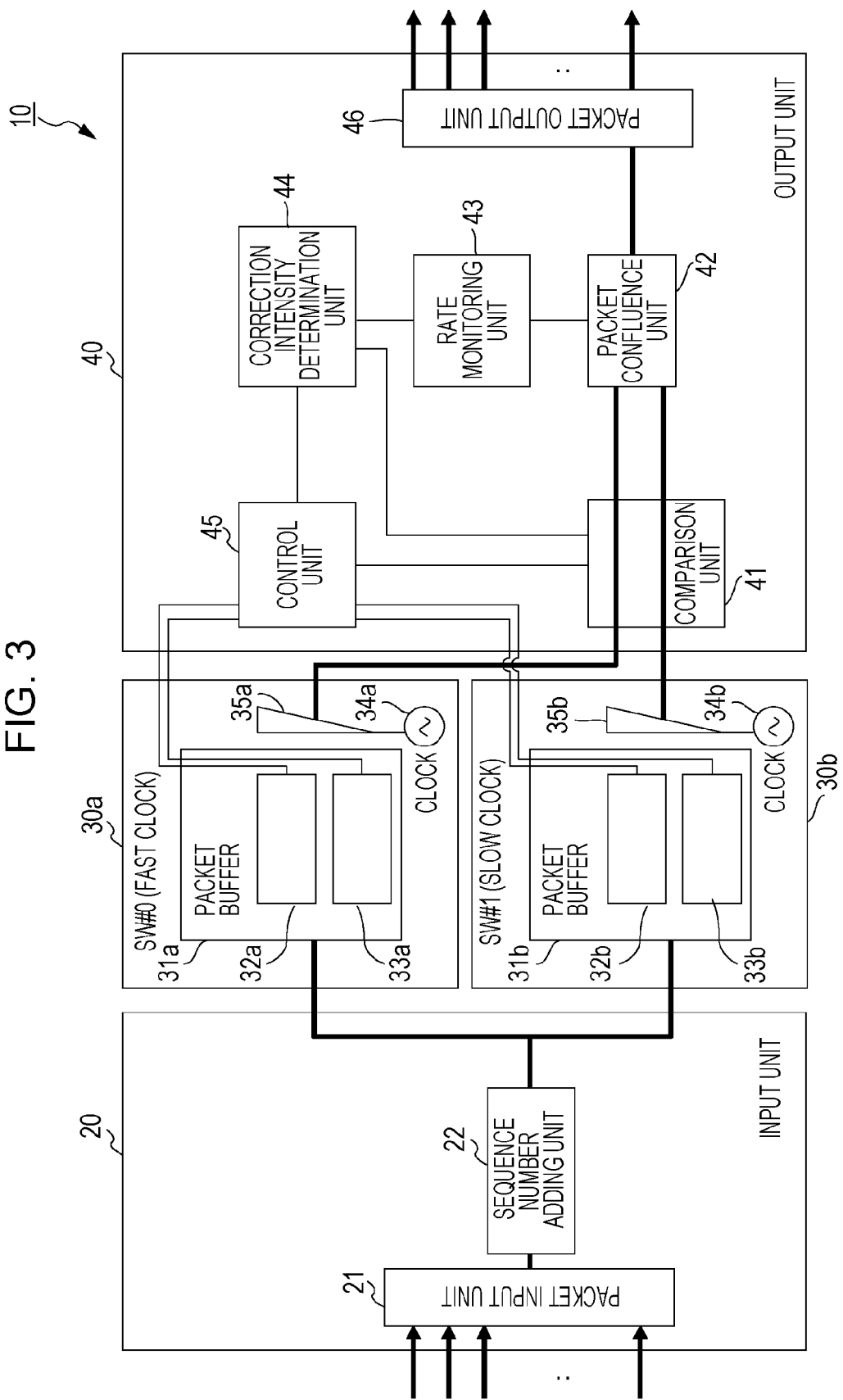
FIG. 3 is a diagram illustrating a configuration example of a relay device, according to an embodiment.

FIG. 3 is a diagram illustrating a configuration example of a relay device, according to an embodiment. In FIG. 3, it is assumed that the relay device 10 is able to relay packets classified into a plurality of classes of quality of service (QoS). For example, when a packet classified into a first class and a packet classified into a second class are relayed, the first class is given higher priority than the second class. In this case, the relay deice 10 preferentially relays a packet of the first class compared to a packet of the second class.

A case where packets are classified into a high-priority class and a low-priority class is described in the following example, but the number of classes into which packets are classified may be changed depending on implementation. Further, a case where the number of switch circuits 30 is two is described in the following example, but the number of the switch circuits 30 may be changed depending on implementation.

The relay device 10 includes an input unit 20, the switch circuits 30 (30a and 30b), and an output unit 40. In the following description, though the input unit 20 and the output unit 40 are illustrated as different blocks merely for improving visualization of the drawing, the input unit 20 and the output unit 40 are physically included in an identical interface.

The input unit 20 includes a packet input unit 21 and a sequence number adding unit 22. Packets received by the relay device 10 are inputted into the packet input unit 21. The packet input unit 21 outputs the inputted packets to the sequence number adding unit 22. The sequence number adding unit 22 adds sequence numbers representing a packet input order to packets for each of classes of packets inputted.

Figure 4:
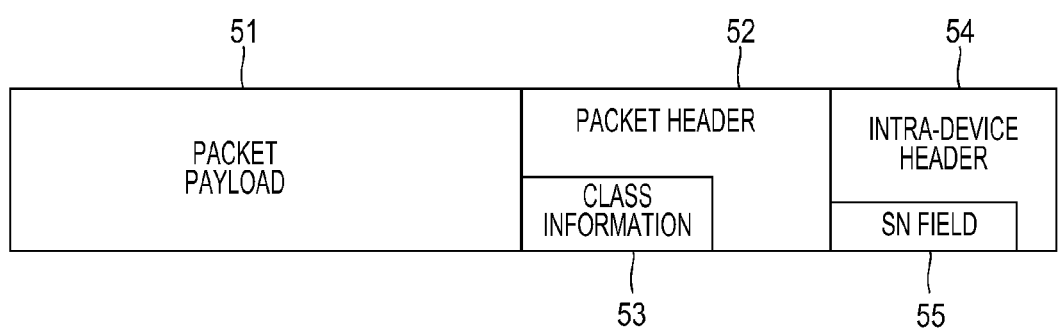
FIG. 4 is a diagram illustrating an example of a format of a packet to which a sequence number is added, according to an embodiment.

FIG. 4 is a diagram illustrating an example of a format of a packet to which a sequence number is added, according to an embodiment. A packet depicted in FIG. 4 includes a packet payload 51, a packet header 52, class information 53, and intra-device header 54. Here, the intra-device header 54 is added by the sequence number adding unit 22. The sequence number adding unit 22 may store information elements and values of the respective information elements which are included in the intra-device header 54. A sequence number (SN) field 55 is one of the information elements of the intra-device header 54 and is generated by the sequence number adding unit 22. The sequence number adding unit 22 specifies a class into which packets are to be classified and determines serial numbers of packets received for each class to be sequence numbers. The sequence number adding unit 22 may be configured to check a priority level of data that is transmitted and received, using the class information 53 included in the packet header 52. The class information 53 may, for example, take on a value of a type of service (TOS) field contained in an internet protocol (IP) header or a value of a traffic class field. Here, the intra-device header 54 is used inside the relay device 10 and is removed from a packet when the packet is outputted to other communication device from the relay device 10.

The sequence number adding unit 22 duplicates a packet to which the intra-device header 54 is added, and outputs one packet to the switch circuit 30a and the other packet to the switch circuit 30b.

The switch circuit 30 includes a packet buffer 31, a clock 34, and a switching unit 35. The packet buffer 31 includes a high-priority packet buffer 32 and a low-priority packet buffer 33. Among packets inputted from the sequence number adding unit 22, high-priority packets are stored in the high-priority packet buffer 32 and low-priority packets are stored in the low-priority packet buffer 33. The clock 34 generates a clock by which the switch circuit 30 operates. The switching unit 35 switches packets that are stored in the high-priority packet buffer 32 and the low-priority packet buffer 33, according to a transmission destination. At this time, the switching unit 35 preferentially processes packets stored in the high-priority packet buffer 32. The switching unit 35 outputs a packet to the output unit 40 to transfer the packet to the transmission destination.

The output unit 40 includes a comparison unit 41, a packet confluence unit 42, a rate monitoring unit 43, a correction intensity determination unit 44, a control unit 45, and a packet output unit 46. The comparison unit 41 compares, for each of classes, sequence numbers of packets outputted from the switch circuits 30a and 30b. For example, the comparison unit 41 compares a sequence number of a packet of a high-priority class which is outputted from the switching unit 35a with a sequence number of a packet of a high-priority class which is outputted from the switching unit 35b. At this time, the comparison unit 41 calculates difference between the sequence number of the packet of the high-priority class which is outputted from the switching unit 35a and the sequence number of the packet of the high-priority class which is outputted from the switching unit 35b. Further, the comparison unit 41 compares the calculated difference with a threshold value. When the difference is larger than the threshold value, the comparison unit 41 determines that packet-switch processing on packets of the high-priority class is out of synchronization (in an out-of-sync state) between the switch circuits 30a and 30b. When the comparison unit 41 determines the out-of-sync state between the switch circuits 30a and 30b, the comparison unit 41 notifies the control unit 45 and the correction intensity determination unit 44 of information identifying the out-of-sync class and the out-of-sync state. Further, the comparison unit 41 also notifies the control unit 45 of information indicating which one of the switch circuits 30a or 30b precedes in the packet-switch processing.

The comparison unit 41 performs similar packet-switch processing on packets of the low-priority class. The processing of the comparison unit 41 will be described in detail later. Here, in the comparison unit 41, packets outputted from the switch circuit 30a and packets outputted from the switch circuit 30b are not mixed. Therefore, as depicted in FIG. 3, wiring (a data path) through which packets outputted from the switch circuit 30a flow and wiring (a data path) through which packets outputted from the switch circuit 30b flow are not connected with each other in the comparison unit 41.

The comparison unit 41 outputs packets received from the switch circuits 30a and 30b to the packet confluence unit 42. Out of packets that are switched by the switch circuits 30a and 30b, the packet confluence unit 42 outputs, to the packet output unit 46, packets that are switched by one of the switch circuits 30a and 30b that is currently used to relay packets, in other words, that is in an active mode. Packets that are not outputted to the packet output unit 46 are discarded by the packet confluence unit 42. For example, in a case where the switch circuit 30a is an active mode, the packet confluence unit 42 outputs packets outputted from the switch circuit 30a to the packet output unit 46 and discards packets outputted from the switch circuit 30b that is an a standby mode. When the packet output unit 46 transmits the packets received from the packet confluence unit 42, the packet output unit 46 removes the intra-device header 54 that has been added by the sequence number adding unit 22.

The rate monitoring unit 43 measures, for each of packet classes, the amount of data contained in packets that is outputted from the packet confluence unit 42 to the packet output unit 46, so as to calculate a ratio of the data amount of the each packet class to the amount of data relayed during a predetermined time period. The data amount is counted by using an arbitrary unit corresponding to implementation, such as bite count of relayed data and the number of relayed packets. The rate monitoring unit 43 outputs the calculated ratio of data amount for each packet class to the correction intensity determination unit 44. Upon being notified of an out-of-sync state and an out-of-sync class from the comparison unit 41, the correction intensity determination unit 44 determines correction intensity. The determination method of correction intensity will be described later. The correction intensity determination unit 44 notifies the control unit 45 of the determined correction intensity.

The control unit 45 control the switch circuit 30 of which packet-switch processing precedes so as to shorten a time period during which the packet switch processing is performed on packets of a class that has been determined to be out-of-sync, in accordance with the notified correction intensity. For example, the control unit 45 may be provided with an ON timer and an OFF timer. During a time period from a time at which the ON timer is set until a time at which the counting of the ON timer is finished, the control unit 45 puts back pressure on the switch circuit 30 of which the packet-switch processing precedes. In the following description, "back pressure" indicates a process that stops, in the switch circuit 30 of which the packet-switch processing precedes, the packet-switch processing on packets of a class that has been determined to be out-of-sync. For example, the control unit 45 may put back pressure by stopping reading out a packet from a buffer storing packets of a class that has been determined to be out-of-sync. Thereafter, the control unit 45 sets the OFF timer to stop back pressure until counting of the OFF timer is finished. Accordingly, during a time period from a time at which the OFF timer is set until a time at which counting of the OFF timer is finished, the packet-switch processing on packets of an out-of-sync class is performed even in the switching unit 35 of which the packet-switch processing precedes.

The control unit 45 determines length of a time which is set for each of the ON timer and the OFF timer, in accordance with the correction intensity notified from the correction intensity determination unit 44. For example, when a sum total of a time set in the ON timer and a time set in the OFF timer is used as reference, the control unit 45 calculates a time which is set for each of the timers so that a ratio of a time set for the ON timer to the reference (the sum total) becomes the correction intensity. An operation of the control unit 45 will be described in detail later.

Figure 5:
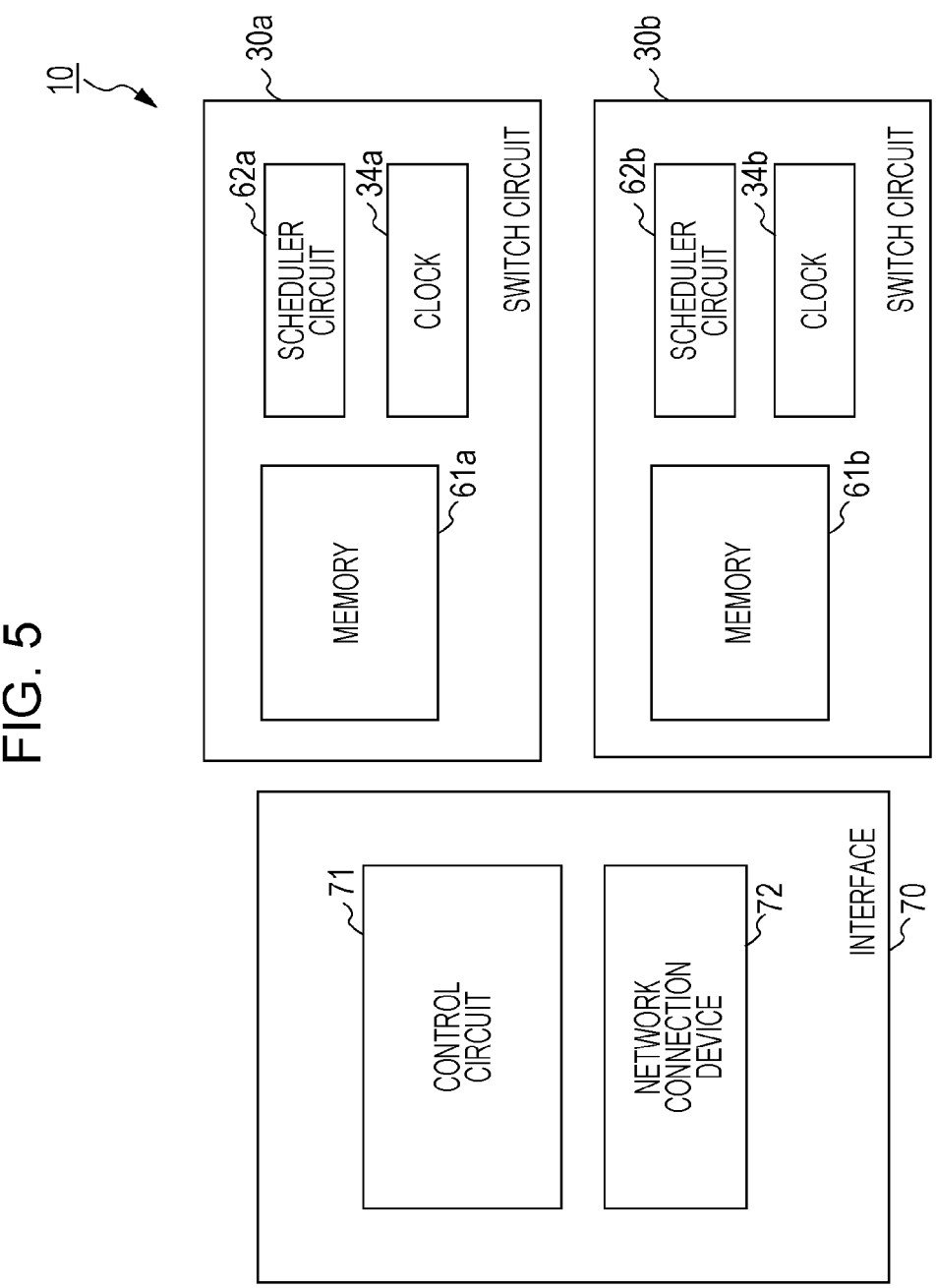
FIG. 5 is a diagram illustrating an example of a hardware configuration of a relay device, according to an embodiment.

FIG. 5 is a diagram illustrating an example of a hardware configuration of a relay device, according to an embodiment. The relay device 10 includes an interface 70 and switch circuits 30a and 30b. Here, the interface 70 operates as an input unit 20 and an output unit 40. The interface 70 includes a control circuit 71 and a network connection device 72. The network connection device 72 operates as the packet input unit 21 and the packet output unit 46. The sequence number adding unit 22, the comparison unit 41, the packet confluence unit 42, the rate monitoring unit 43, the correction intensity determination unit 44, and the control unit 45 are realized by the control circuit 71. The control circuit 71 may be a field-programmable gate array (FPGA), a large scale integration (LSI), or the like, for example. The switch circuits 30 respectively include memories 61 (61a and 61b), scheduler circuits 62 (62a and 62b), and clocks 34a and 34b. Here, the memory 61 operates as the packet buffer 31. The scheduler circuit 62 operates as the switching unit 35. Further, the clock operates as the clock 34. Here, part or the whole of the interface 70 and the switch circuits 30a and 30b may be provided with a processor such as a central processing unit (CPU), and the comparison unit 41, the packet confluence unit 42, the rate monitoring unit 43, the correction intensity determination unit 44, the control unit 45, the switching unit 35, and the like may be realized by the CPU.

<First Embodiment>

Figure 6:
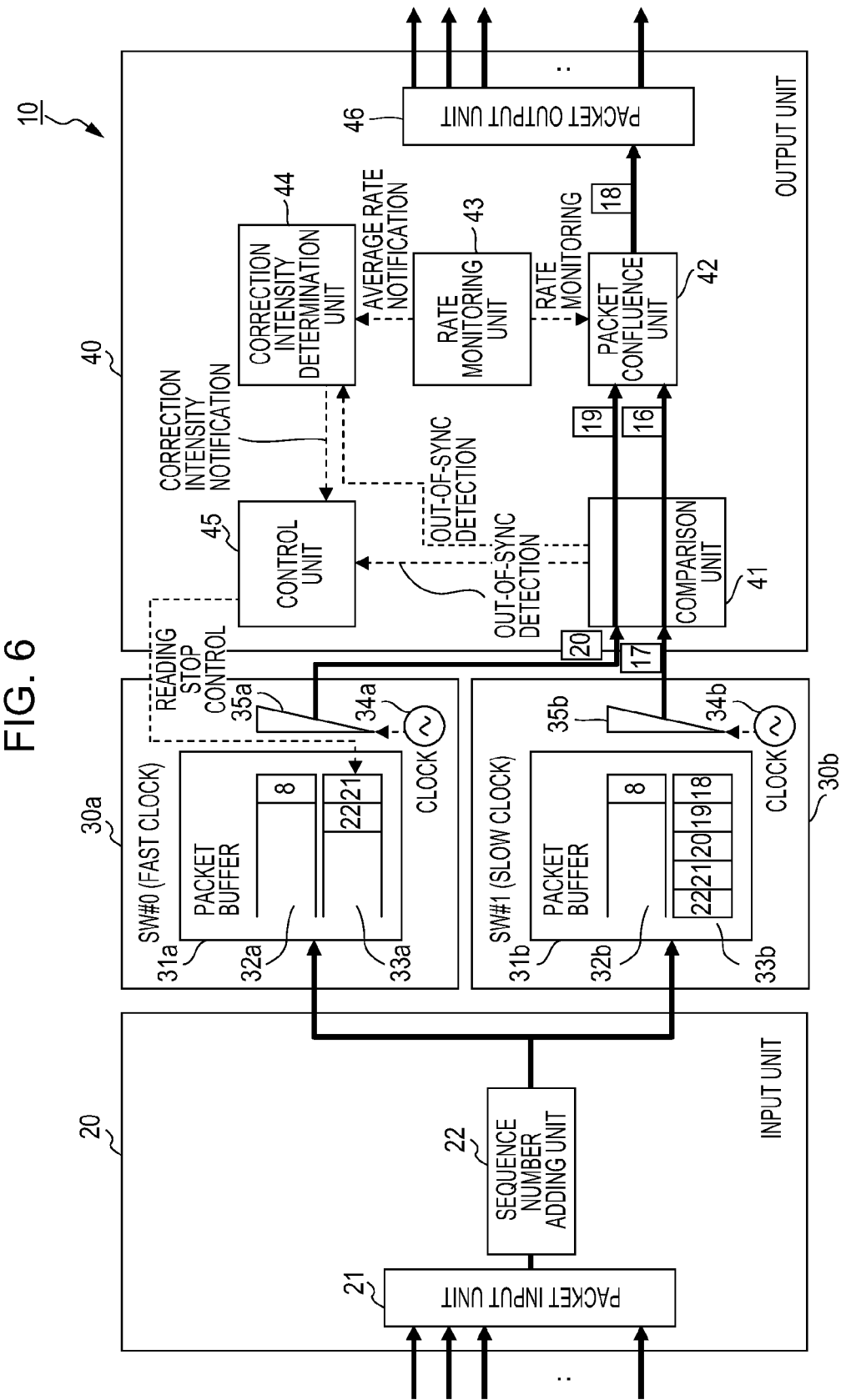
FIG. 6 is a diagram illustrating an example of an operational procedure when a packet is relayed by a relay device, according to a first embodiment.

FIG. 6 is a diagram illustrating an example of an operational procedure when a packet is relayed by a relay device, according to a first embodiment. In this example, the switch circuit 30a is in an active mode and used for switching packets to be relayed, and the switch circuit 30b is in a standby mode. That is, packets switched by the switch circuit 30a are outputted from the packet output unit 46.

In the following description, it is assumed that the clock 34a has a slightly higher frequency than the clock 34b. Accordingly, the switch circuit 30a operates at a clock speed faster than that of the switch circuit 30b, and the packet-switch processing of the switch circuit 30a progresses faster than that of the switch circuit 30b. Further, in the following description and drawings, the switch circuit 30a and the switch circuit 30b will be also expressed as "SW#0" and "SW#1" respectively.

In procedure (1), the packet input unit 21 inputs a received packet into the sequence number adding unit 22.

In procedure (2), the sequence number adding unit 22 adds the intra-device header 54 to the inputted packet. The sequence number adding unit 22 checks the class information 53 of the packet received from the packet input unit 21 so as to determine whether the inputted packet belongs to a high-priority class or a low-priority class. When the inputted packet is a high-priority packet, the sequence number adding unit 22 records, in the sequence number field 55, a sequence number indicating the order in which packets of the high-priority class are inputted into the sequence number adding unit 22. Meanwhile, when a low-priority packet is inputted to the sequence number adding unit 22, the sequence number adding unit 22 records, in the sequence number field 55, a sequence number indicating the order in which packets of the low-priority class are inputted into the sequence number adding unit 22. The sequence number adding unit 22 duplicates a packet in which the sequence number is stored in the sequence number field 55, and outputs the packets to both the switch circuit 30a and the switch circuit 30b.

In procedure (3), the switch circuit 30a checks class information 53 of the packet received from the sequence number adding unit 22. When the class information 53 indicates a high-priority class, the switch circuit 30a stores the inputted packet into the high-priority packet buffer 32a. On the other hand, when the class information 53 indicates a low-priority class, the switch circuit 30a stores the inputted packet into the low-priority packet buffer 33a. The switch circuit 30b also performs a similar operation.

FIG. 6 illustrates a state where a high-priority packet having a sequence number "8" is inputted into both the switch circuits 30a and 30b. The switch circuit 30a stores the high-priority packet with sequence number "8" into the high-priority packet buffer 32a. Further, the switch circuit 30b also stores the high-priority packet with sequence number "8" into the high-priority packet buffer 32b in a similar manner.

In the example of FIG. 6, it is assumed that the relay device 10 has received 22 low-priority packets and the switching unit 35a has performed packet-switch processing on the low-priority packet with sequence number "20" before the high-priority packet with sequence number "8" is stored in the high-priority packet buffer 32a. Accordingly, the low-priority packets with sequence number "21" and "22" are currently stored in the low-priority packet buffer 33a of the switch circuit 30a. On the other hand, it is assumed that the switching unit 35b has performed the packet-switch processing on the low-priority packet with sequence number "17" before the high-priority packet with sequence number (hereinafter will be also abbreviated as SN) "8" is stored in the high-priority packet buffer 32b. Accordingly, the low-priority packets with SNs "18" to "22" are currently stored in the low-priority packet buffer 33b of the switch circuit 30b.

In procedure (4), the comparison unit 41 checks sequence numbers and the class information 53 of the packets received from the switch circuits 30a and 30b. The comparison unit 41 stores a sequence number of a packet that has been inputted last with respect to each of classes, in association with the each class identified by the class information 53.

FIG. 7 is a diagram illustrating an example of a table held by a comparison unit, according to an embodiment. FIG. 7 illustrates an example of a table obtained when the comparison unit 41 processes packets on which the packet-switch processing has been performed in the above procedure (3). The comparison unit 41 recognizes that the low-priority packet having SN "20" is inputted from the switch circuit 30a (SW#0). Then, the comparison unit 41 updates the latest sequence number of the SW#0 associated with the low-priority class to 20 as depicted in FIG. 7. Further, the comparison unit 41 recognizes that the low-priority packet having SN "17" is inputted from the switch circuit 30b (SW#1) and updates the latest sequence number of the SW#1 associated with the low-priority class to 17. In the example of FIG. 7, regarding the high-priority class, the packet-switch processing on up to the high-priority packet having SN "7" has been completed by both the switch circuits 30a and 30b.

In procedure (5), the comparison unit 41 calculates, for each of classes, difference between a sequence number of the latest packet received from the switch circuit 30a and a sequence number of the latest packet received from the switch circuit 30b. Further, the comparison unit 41 compares the calculated difference with a preliminarily stored threshold value, and when the difference exceeds the threshold value, the comparison unit 41 determines that the packet-switch processing is in an out-of-sync state between the switch circuits 30a and 30b, with respect to a class for which the difference exceeds the threshold value. In the following description, it is assumed that a threshold value stored in the comparison unit 41 is "2". Here, the threshold value may be changed to an arbitrary integer depending on implementation.

In the example of FIG. 7, for the high-priority class, both the sequence number of the packet inputted last from the switch circuit 30a and the sequence number of the packet inputted last from the switch circuit 30b are "7". Accordingly, difference for the high-priority class is "0". Therefore, the comparison unit 41 determines that the switch circuit 30a is in synchronization with the switch circuit 30b.

Meanwhile, for the low-priority class, the sequence number of the packet inputted last from the switch circuit 30a is "20", whereas the sequence number of the packet inputted last from the switch circuit 30b is "17". Accordingly, difference for the low-priority class is 20−17=3 which exceeds the threshold value. Therefore, the comparison unit 41 determines that the switch circuit 30a is losing synchronization with the switch circuit 30b for the low-priority class.

In procedure (6), the comparison unit 41 outputs the packets of which the sequence numbers have been compared, to the packet confluence unit 42. For example, in FIG. 6, the packet of the low-priority class having SN "19", on which the packet-switch processing has been performed by the switch circuit 30a, is outputted from the comparison unit 41. At the same time, the comparison unit 41 outputs the packet of the low-priority class having SN "16", on which the packet-switch processing has been performed by the switch circuit 30b, to the packet confluence unit 42.

In procedure (7), out of the packets outputted from the comparison unit 41, the packet confluence unit 42 outputs a packet on which the packet-switch processing has been performed by a switch circuit 30 that is in an active mode, to the packet output unit 46. The comparison unit 41 discards a packet on which the packet-switch processing has been performed by a switch circuit 30 that is in a standby mode. For example, it is assumed that the packet of the low-priority class having SN "18" on which the packet-switch processing has been performed by the switch circuit 30a and the packet of the low-priority class having SN "15" on which the packet-switch processing has been performed by the switch circuit 30b are inputted into the packet confluence unit 42. In this example, since the switch circuit 30a is in an active mode, the packet confluence unit 42 outputs the packet of the low-priority class having SN "18" on which the packet-switch processing has been performed by the switch circuit 30a, to the packet output unit 46. The packet output unit 46 transmits the packet received from the packet confluence unit 42 to the destination.

Next, synchronization establishment that is performed in the relay device 10 will be described. In the procedure (5), the comparison unit 41 has detected that there is a class which is in an out-of-sync state. Since a class of which synchronization is not established (an out-of-sync class) is regarded as an object on which synchronization establishment processing is to be performed by the control unit 45, the out-of-sync class will be also expressed as a "control class" in the following description.

In procedure (8), the comparison unit 41 notifies the correction intensity determination unit 44 and the control unit 45 of a control class. Further, the comparison unit 41 notifies the control unit 45 of information on which one of the switch circuits 30a and 30b precedes in the packet-switch processing.

In the example of FIG. 7, the comparison unit 41 has detected that the packet-switch processing is in an out-of-sync state between the switch circuits 30a and 30b as to packets of the low-priority class. Accordingly, the comparison unit 41 notifies the correction intensity determination unit 44 that the low-priority class is a "control class". Further, the comparison unit 41 notifies the control unit 45 that the control class is the low-priority class and the packet-switch processing of the switch circuit 30a progresses ahead of the packet-switch processing of the switch circuit 30b. Here, in the following description, one of the switch circuits 30 to be synchronized that precedes in the packet-switch processing on packets of the control class will be also expressed as an "object switch". The object switch is one of the switch circuits 30 that is to be controlled by the control unit 45, as described later. In the example of FIG. 7, the object switch is the switch circuit 30a.

In procedure (9), when the correction intensity determination unit 44 is notified of information on the out-of-sync state from the comparison unit 41, the correction intensity determination unit 44 inquires a ratio of the data amount of the control class to the amount of the whole data that is transmitted/received, from the rate monitoring unit 43. The rate monitoring unit 43 classifies all data that is outputted from the packet confluence unit 42 during a predetermined time period in association with each of classes, and obtains a ratio of the data amount of each class to the amount of whole data outputted during the predetermined time period. Hereinafter, the above obtained ratio will be also expresses as a "data ratio". At this time, the rate monitoring unit 43 may obtain a moving average by using the data ratio which is obtained by periodical observation. In the following description, a moving average of a data ratio of a control class will be also referred to as an "average rate". By using an average rate, an influence due to short-term fluctuation of a data ratio may be suppressed. The rate monitoring unit 43 may notify the correction intensity determination unit 44 of, as the n-th average rate, an average rate obtained by the following expression:

$$n\text{-th average rate}=(n-1)\text{th average rate} \times Wq + \text{observation rate} \times (1-Wq).$$

Here, the "observation rate" is a data ratio which is obtained by the rate monitoring unit 43 by observation during the last time period before calculation of an average rate. "Wq" is a weight coefficient, and has a value satisfying $0 \leq Wq < 1$. Further, "n" is an arbitrary integer equal to or greater than 2. Here, calculation method performed in the rate monitoring unit 43 may be appropriately changed depending on implementation.

Figure 1:
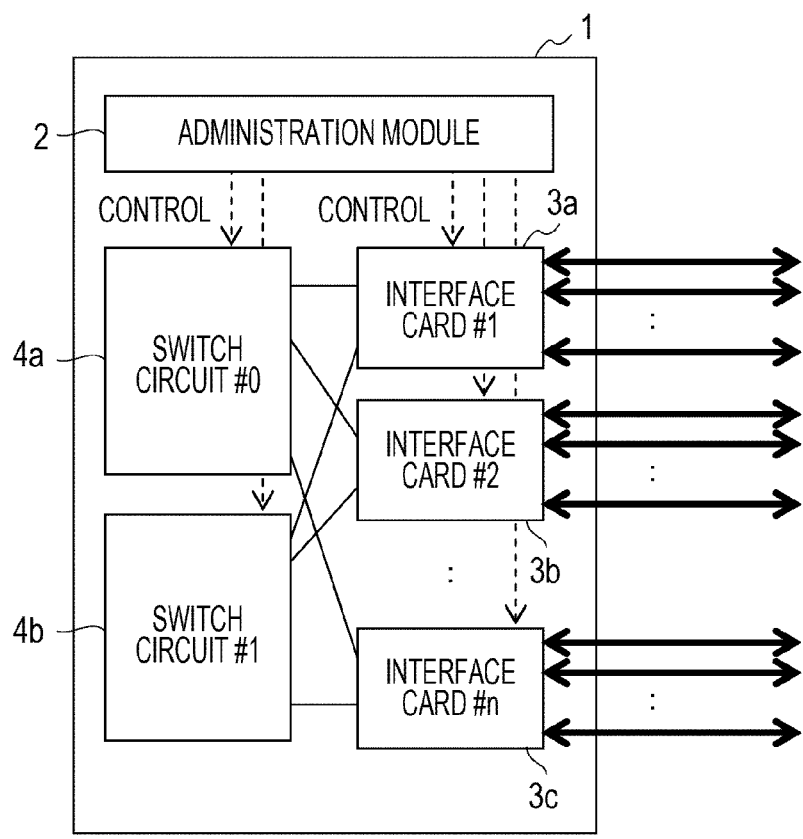
FIG. 1 is a diagram illustrating an example of a relay device.
Figure 2A:
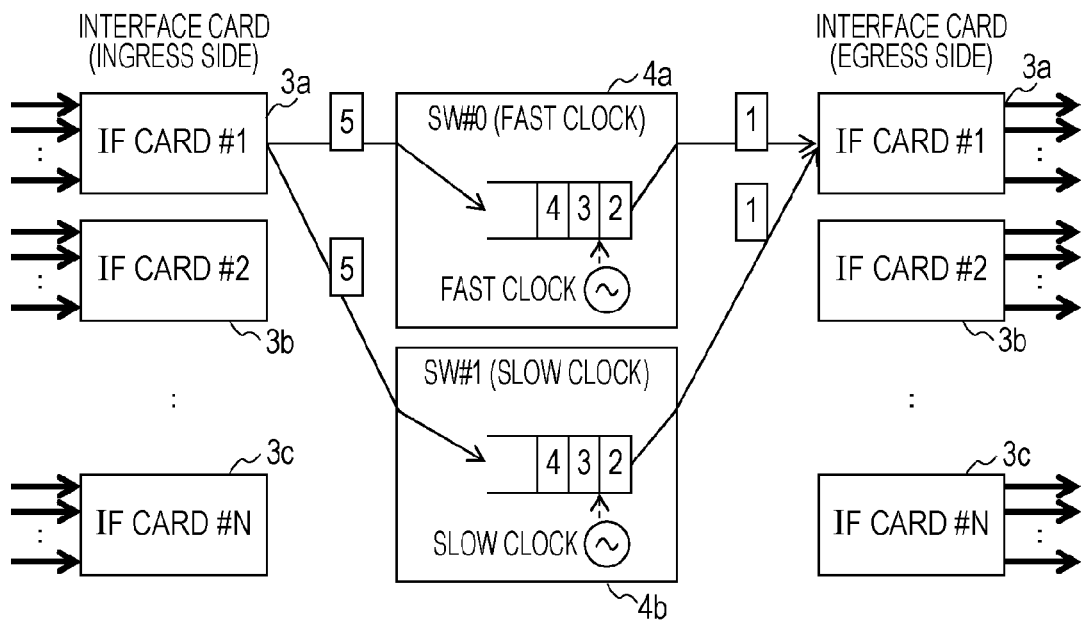
FIGS. 2A and 2B are diagrams each illustrating an example of an operation when synchronization is lost between two switch circuits.
Figure 2B:
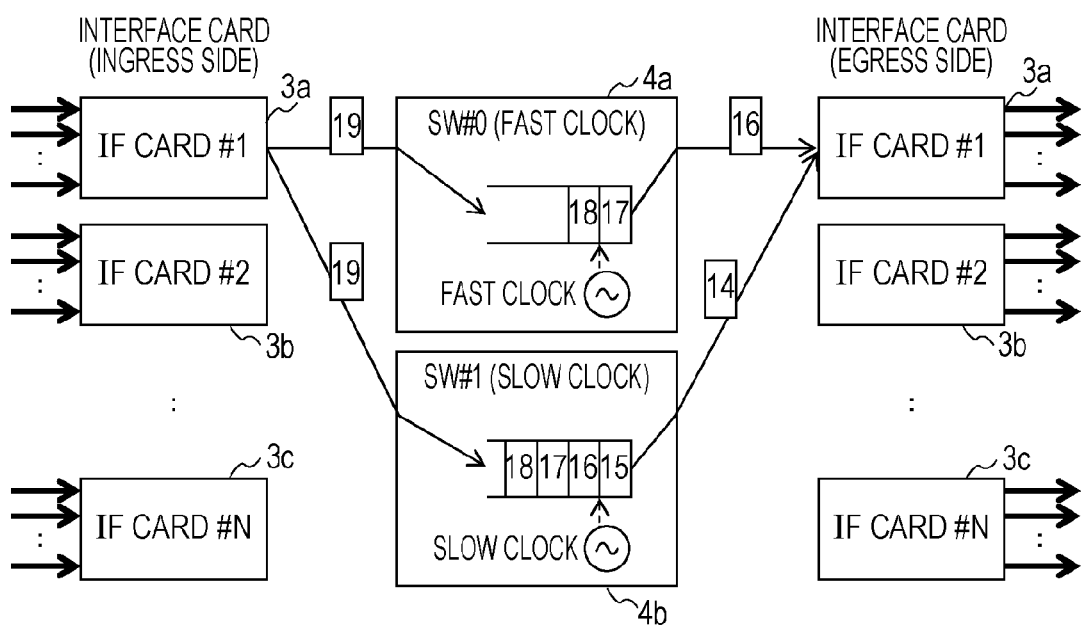

In procedure (10), the correction intensity determination unit 44 determines correction intensity in accordance with the data ratio of a control class. For example, when a reception rate of the control class is high, traffic of a class of which priority is higher than the control class is relatively small. This case is close to a state where packets of one type of class are switched as depicted in FIG. 2B, that is, a state where an effect of correction (back pressure) put on the switch circuit 30 is relatively easily exhibited. Accordingly, when the data ratio of the control class is high, it is highly likely that correction of short back pressure time, that is, relatively weak correction works effectively. Therefore, the correction intensity determination unit 44 determines to reduce a value of correction intensity to perform weak correction.

On the other hand, when the reception rate of the control class is low, traffic of a class whose priority is higher than the control class is relatively large and packet-switch processing on packets of the control class is being pressured by packet-switch processing on high-priority packets. In this case, there is a high possibility that, during a time period in which back pressure is being put on the object switch, the packet-switch processing is performed on packets of a class whose priority is higher than the control class by a switch circuit 30 of which the packet-switch processing progresses slower than the object switch. If the switch circuit 30 of which the packet-switch processing progresses slower than the object switch fails to perform the packet-switch processing on packets of the control class during a time period in which back pressure is being put on the object switch, the packet-switch processing on packets of the control class fails to catch up with that of the object switch. That is, if a switch circuit of which the packet-switch processing progresses slower than the object switch fails to perform the packet-switch processing on packets of the control class during a time period in which back pressure is being put on the object switch, synchronization between the switch circuit and the object switch is not established. Thus, it may be said that a case where a ratio of the number of packets of the control class to the whole packets is low indicates a state in which it is relatively difficult to obtain an effect of correction (back pressure) put on the switch circuit 30. Therefore, when the ratio of the control class to the whole packets is low, the correction intensity determination unit 44 enlarges a value of the correction intensity to lengthen a time period in which back pressure is being put on the object switch. In other words, in a case where traffic of a class whose priority is higher than the control class is larger, the correction intensity determination unit 44 enlarges a value of the correction intensity.

FIG. 8 is a diagram illustrating an example of a table held by a correction intensity determination unit, according to an embodiment. When the table depicted as FIG. 8 is provided for the correction intensity determination unit 44, the correction intensity determination unit 44 selects correction intensity from the table. For example, it is assumed that the data ratio of a low-priority class is set to be less than 75%. In this case, 25% or more of the whole data is the data ratio of a high-priority class. Accordingly, a packet of the high-priority class may be processed in the switch circuit 30b when back pressure is put on the switch circuit 30a. Therefore, the correction intensity determination unit 44 enlarges correction intensity so as to increase the possibility that a packet of the low-priority class is processed in the switch circuit 30b during a time period in while back pressure is being put on the switch circuit 30a. In this example, it is assumed that the correction intensity determination unit 44 determines the correction intensity to be 60%. The correction intensity determination unit 44 notifies the control unit 45 of the determined correction intensity along with information identifying the control class.

In procedure (11), when the control unit 45 is notified of the correction intensity from the correction intensity determination unit 44, the control unit 45 calculates a time period during which the packet-switch processing on packets of the control class is to be stopped by the object switch. Here, the control unit 45 has been already notified that the control class is a low-priority class and the object switch is the switch circuit 30a by the comparison unit 41 in the procedure (8). In the case, the control unit 45 determines setting time of the ON timer and the OFF timer so that the setting time satisfies the equation:

$$\text{correction intensity} = \text{setting time of ON timer}/(\text{setting time of ON timer} + \text{setting time of OFF timer}).$$

The control unit 45 causes the object switch to stop processing of reading out a packet of the control class during a time period set in the ON timer. Therefore, the packet-switch processing on a packet of the control class is not performed by the object switch during the time period set in the ON timer. When counting of the ON timer is finished, the control unit 45 causes the object switch to resume the processing of reading out a packet of the control class during a time period set in the OFF timer. Accordingly, the packet-switch processing on a packet of the control class is performed also by the object switch during a time period set in the OFF timer. In this way, the control unit 45 limits a time period during which the packet-switch processing is performed on a packet of the control class by the object switch, using the determined setting time, until the control unit 45 receives new notification from the correction intensity determination unit 44 or the comparison unit 41. Here, when synchronization is not established by single control, the control unit 45 repeats processing of limiting reading out a packet of the control class by the object switch.

For example, when the control unit 45 is notified that the correction intensity is 60%, from the correction intensity determination unit 44, in the procedure (10), the control unit 45 may determine the setting time of the ON timer as six slot times and the setting time of the OFF timer as four slot times. In this example, since the object switch is the switch circuit 30a and the control class is the low-priority class, the control unit 45 causes the switch circuit 30a to stop packet-readout processing for reading out packets from the low-priority packet buffer 33a during six slot times. Subsequently, the control unit 45 causes the switch circuit 30a to resume, during four slot times, the packet-readout processing for reading out packets from the low-priority packet buffer 33a.

Here, the switching unit 35b performs the packet-switch processing on a packet of the control class even while the switching unit 35a does not read out a packet of the control class from the low-priority packet buffer 33a. In other words, the switching unit 35b performs the packet-switch processing (packet-readout processing) on a packet of the control class during a time period equal to a sum of the setting time of the ON timer and the setting time of the OFF timer. Accordingly, when a time period during which the switching unit 35b performs the packet-switch processing is set to be reference, a ratio of a time period during which packet-readout processing on the low-priority packet buffer 33a is performed, to the reference, accords with the correction intensity. That is, it may be said that the control unit 45 sets a time period during which packet-readout processing on a packet of the control class is stopped by the object switch, at a value obtained by multiplying a time period during which the packet-switch processing is performed by a switch circuit 30 other than the object switch by the correction intensity. For example, when the correction intensity is 60%, packet-readout processing on a packet of the control class is stopped by the object switch during a time period of 60% of the total time period during which the packet-switch processing is performed by the switch circuit 30 other than the object switch. Accordingly, the packet-switch processing on a packet of the control class is stopped by the object switch during a time period of 60% of the total time period during which the packet-switch processing is performed by the switch circuit 30 other than the object switch.

In procedure (12), the comparison unit 41, the packet confluence unit 42, and the rate monitoring unit 43 continue operations thereof also during a time period in which the procedure (11) is performed. Accordingly, the rate monitoring unit 43 obtains, for each of classes of packets, a ratio of the amount of data (hereinafter, also expresses as "data ratio") of the each class to the amount of data that is relayed by the relay device 10, and notifies the correction intensity determination unit 44 of the obtained data ratio, during a time period in which the procedure (11) is performed. When the correction intensity determination unit 44 changes the correction intensity in accordance with the data ratio notified from the rate monitoring unit 43, the correction intensity determination unit 44 notifies the control unit 45 of new correction intensity.

For example, it is assumed that data ratio of a low-priority class becomes 80% as a result of increase in the amount of data of the low-priority class that is relayed by the relay device 10 while the control unit 45 performs the procedure (11). In this case, the data ratio of the low-priority class is increased compared to the data ratio obtained when the correction intensity is determined in the procedure (10). Therefore, if the correction intensity is not changed, the packet-switch processing of the switch circuit 30a may be delayed compared to that of the switch circuit 30b due to an excess of correction. Accordingly, the correction intensity determination unit 44 changes the correction intensity, for example, to 20% by using the table depicted as FIG. 8. The correction intensity determination unit 44 notifies the control unit 45 of the changed correction intensity associated with the control class.

In procedure (13), when the control unit 45 receives the notification of the correction intensity from the correction intensity determination unit 44, the control unit 45 determines the setting time of the ON timer and setting time of the OFF timer on the basis of calculation similar to that of the procedure (11). In this example, it is assumed that the control unit 45 determines the setting time of the ON timer to be two slot times and the setting time of the OFF timer to be eight slot times. After the control unit 45 determines the setting time, the control unit 45 changes the setting time of the ON timer and the setting time of the OFF timer when back pressure is put subsequently. That is, after the control unit 45 causes the object switch to stop packet-readout processing on the low-priority packet buffer 33a during two slot times, the control unit 45 causes the object switch to resume the packet-readout processing on the low-priority packet buffer 33a during eight slot times.

In procedure (14), the comparison unit 41 compares sequence numbers added to packets received from respective switch circuits 30a and 30b, for each of classes, during the performance of the processing of the procedures (11) to (13) as well. When the comparison unit 41 detects that synchronization is established, the comparison unit 41 notifies the control unit 45 and the correction intensity determination unit 44 of the synchronization establishment and a class of which synchronization is established. When the control unit 45 receives the notification from the comparison unit 41, the control unit 45 ends the processing of putting back pressure on the class of which the synchronization establishment is notified. On the other hand, when the correction intensity determination unit 44 receives the notification from the comparison unit 41, the correction intensity determination unit 44 stops processing of determining correction intensity which is used to perform the processing of putting back pressure on the class of which the synchronization establishment is notified.

For example, it is assumed that the comparison unit 41 has detected that difference between a sequence number of a packet outputted from the low-priority packet buffer 33a and a sequence number of a packet outputted from the low-priority packet buffer 33b is smaller than a threshold value. In this case, the comparison unit 41 determines that the packet-switch processing on packets of the low-priority class is synchronous between the switch circuits 30a and 30b. Accordingly, the comparison unit 41 notifies the correction intensity determination unit 44 and the control unit 45 that synchronization is established between the switch circuits 30a and 30b regarding the packet-switch processing on packets of the low-priority class. Then, the control unit 45 ends the processing of limiting the reading out from the low-priority packet buffer 33a. Further, the correction intensity determination unit 44 ends processing of calculating correction intensity that is used for the packet-switch processing on packets of the low-priority class.

In procedure (15), the comparison unit 41 continues to compare sequence numbers of packets received from the switch circuits 30a and 30b, for each of classes, so as to monitor whether the switch circuits 30a and 30b are in synchronization with each other, even after the completion of the procedure (14). When the switch circuit 30a and 30b lose synchronization, the processing described on and after the procedure (5) is repeated.

Through the above-described procedures, in a case where frequencies of the clocks 34a and 34b are different from each other, synchronization may be recovered between the switch circuits 30a and 30b which have been out of synchronization with each other. Since the switch circuits 30a and 30b have different operation frequencies from each other, the switch circuits 30a and 30b may become out of synchronization with each other again even after synchronization is established. However, whenever the comparison unit 41 detects an out-of-sync state, synchronization may be recovered. Here, the above-described processing from procedures (1) to (15) is an example of processing, and the procedures may be variously modified.

Figure 9:
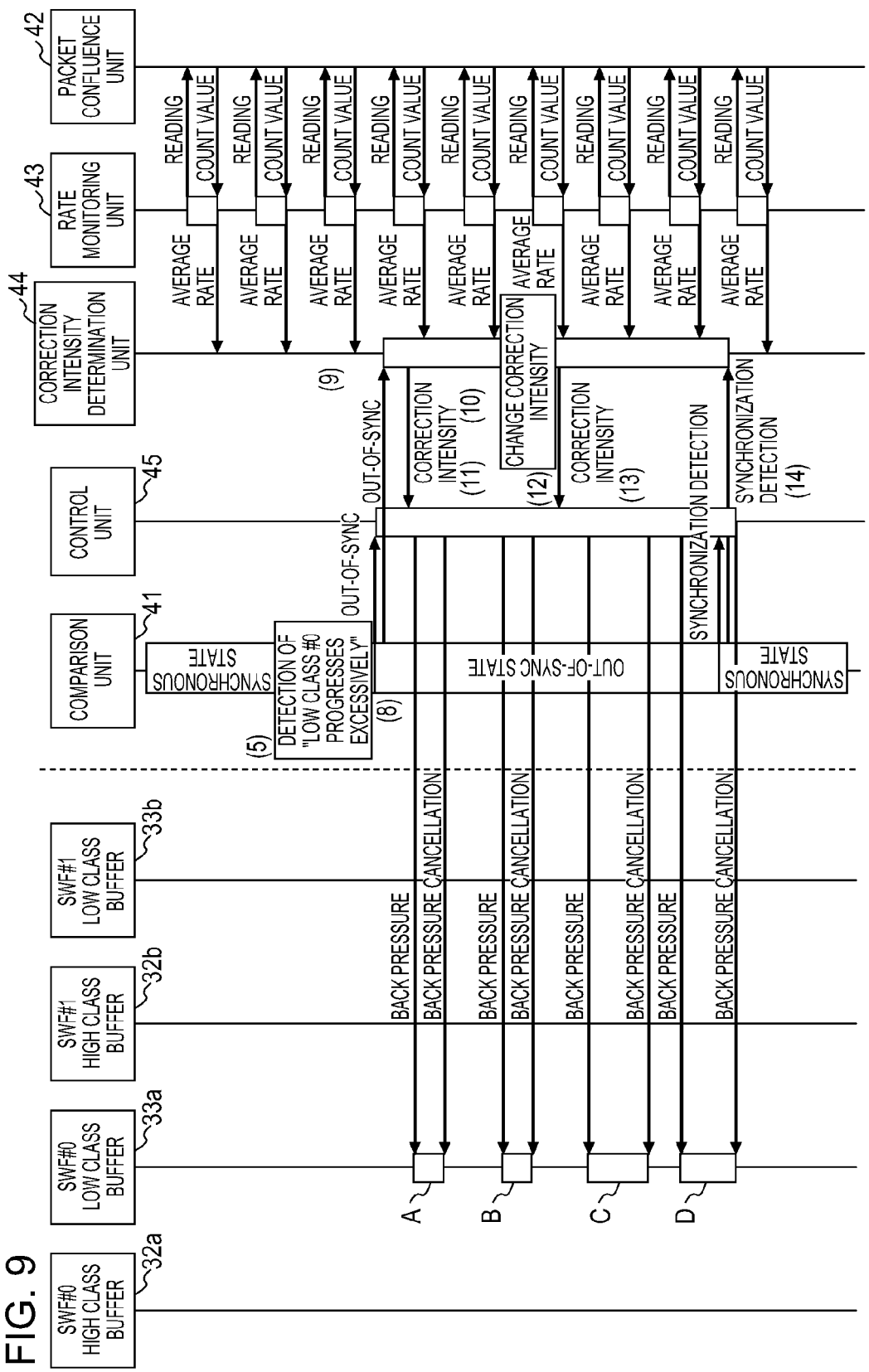
FIG. 9 is diagram illustrating an example of an operational sequence for establishing synchronization, according to an embodiment.

FIG. 9 is diagram illustrating an example of an operational sequence for establishing synchronization, according to an embodiment. Digits in parenthesis depicted in FIG. 9 are numbers of the above-described procedures. As depicted in FIG. 9, the rate monitoring unit 43 may regularly notify the correction intensity determination unit 44 of an average rate of each class before the comparison unit 41 detects an out-of-sync state. In this case, when the correction intensity determination unit 44 is notified of the out-of-sync state from the comparison unit 41, the correction intensity determination unit 44 may determine correction intensity for the control class by using the average rate that has been notified lastly from the rate monitoring unit 43.

Upon determining the correction intensity, the correction intensity determination unit 44 notifies the control unit 45 of the determined correction intensity so that control is performed as described in the above procedure (11). In FIG. 9, packet-readout processing of reading out packets from the low-priority packet buffer 33a is stopped during time periods A, B, C, and D. Therefore, there is a possibility that packets accumulated in the low-priority packet buffer 33b are switched during the periods A, B, C, and D, but packets accumulated in the low-priority packet buffer 33a are not switched. Accordingly, there is a possibility that difference between the minimum value of sequence numbers of packets accumulated in the low-priority packet buffer 33b and the minimum value of sequence numbers of packets accumulated in the low-priority packet buffer 33a becomes small. When the above-mentioned difference between sequence numbers becomes smaller than a threshold value stored in the comparison unit 41, the comparison unit 41 determines that synchronization is established between the switch circuits 30a and 30b. Then, as indicated by an arrow associated with the procedure (14), the correction intensity determination unit 44 and the control unit 45 are notified that synchronization is established, from the comparison unit 41.

Further, when the correction intensity determination unit 44 changes correction intensity in accordance with an average rate, the control unit 45 is notified of new correction intensity, as depicted by an arrow associated with procedure (12). The control unit 45 calculates time to be set for the ON timer and time to be set for the OFF timer by using the latest correction intensity so as to perform control as indicated by the procedure (13).

Figure 10:
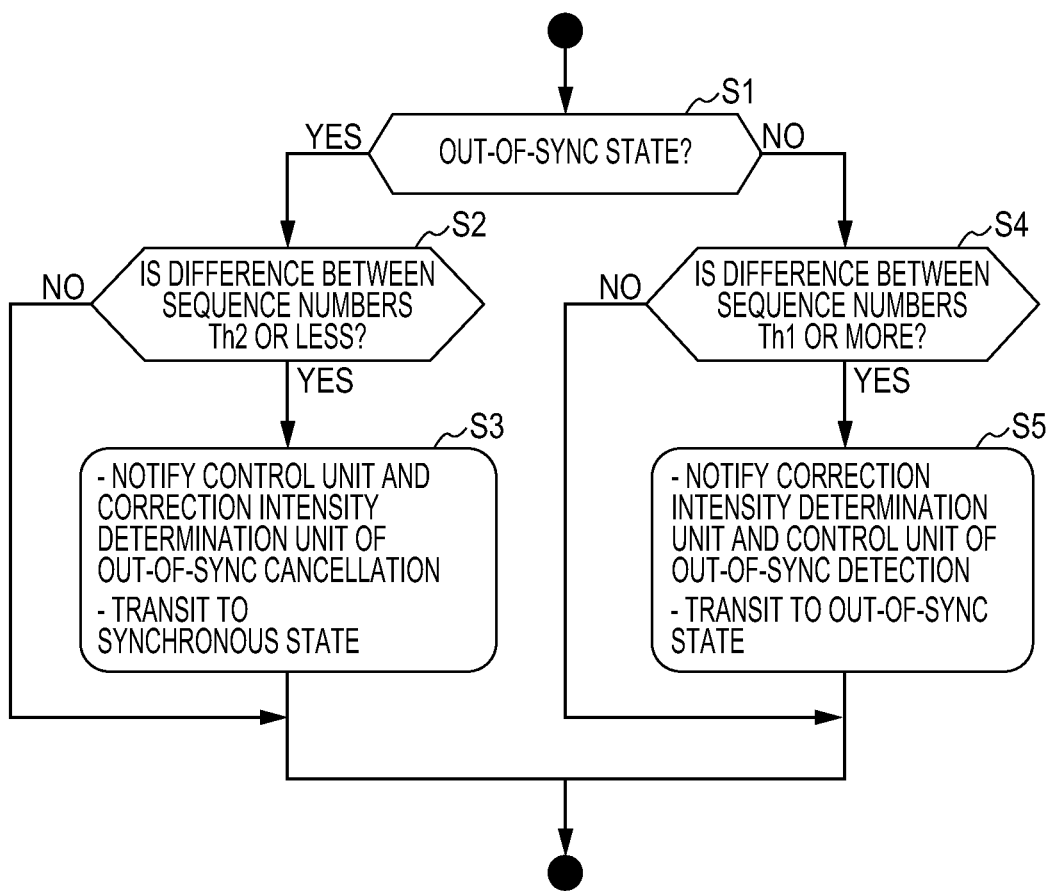
FIG. 10 is a diagram illustrating an example of an operational flowchart performed by a comparison unit, according to an embodiment.

FIG. 10 is a diagram illustrating an example of an operational flowchart performed by a comparison unit, according to an embodiment. In the example of FIG. 10, it is assumed that the comparison unit 41 stores preceding determination results for respective classes. That is, when it is determined that synchronization is established for a class in the preceding processing, the comparison unit 41 stores information indicating the synchronous state in association with the class. On the other hand, when it is determined that synchronization is not established for a class in the preceding processing, the comparison unit 41 stores information indicating an out-of-sync state in association with the class. When determination is performed for the first time, the comparison unit 41 handles the case similarly to a case where the preceding determination result indicates a synchronous state. Further, it is assumed that the comparison unit 41 uses two threshold values: a threshold value Th1 for determining whether synchronization is established and a threshold value Th2 for determining whether an out-of-sync state is resolved, where the threshold value Th1 is an integer larger than the threshold value Th2 by one.

In operation S1, the comparison unit 41 identifies a class for which difference between sequence numbers is to be obtained and determines whether the preceding determination result for the identified class is an out-of-sync state or not. When the preceding determination result is the out-of-sync state (YES in operation S1), the comparison unit 41 calculates difference between sequence numbers to compare the difference with the threshold value Th2 (in operation S2). When the difference between sequence numbers is equal to or less than the threshold value Th2 (YES in operation S2), the process proceeds to operation S3.

In operation S3, the comparison unit 41 determines that synchronization is established between the switch circuits 30a and 30b by processing of the control unit 45. Accordingly, the comparison unit 41 notifies the control unit 45 and the correction intensity determination unit 44 of notification indication that synchronization is established (out-of-sync cancellation) regarding a control class. Further, the comparison unit 41 stores the present determination result representing the synchronous state and ends the processing.

On the other hand, when the difference between sequence numbers is equal to or larger than the threshold value Th2 (NO in operation S2), the comparison unit 41 determines that the out-of-sync state of the control class is continuing and ends the processing without performing the processing of operation S3.

Meanwhile, in a case where the preceding determination result is a synchronous state or a case where difference between sequence numbers is calculated for the first time (NO in operation S1), the comparison unit 41 compares the difference between sequence numbers with the threshold value Th1 (in operation S4). When the difference between sequence numbers is equal to or larger than the threshold value Th1 (YES in operation S4), the process proceeds to operation S5.

In operation S5, the comparison unit 41 determines that the switch circuits 30a and 30b become out-of-sync regarding packets of a class subject to determination. Accordingly, the comparison unit 41 notifies the control unit 45 and the correction intensity determination unit 44 of information on the out-of-sync state between the switch circuits 30 (out-of-sync detection). Further, the comparison unit 41 stores the present determination result representing the out-of-sync state and ends the processing.

On the other hand, when the difference between sequence numbers is less than the threshold value Th1 (NO in operation S4), the comparison unit 41 determines that the synchronous state is continuing and ends the processing without performing the processing of operation S5.

Figure 11:
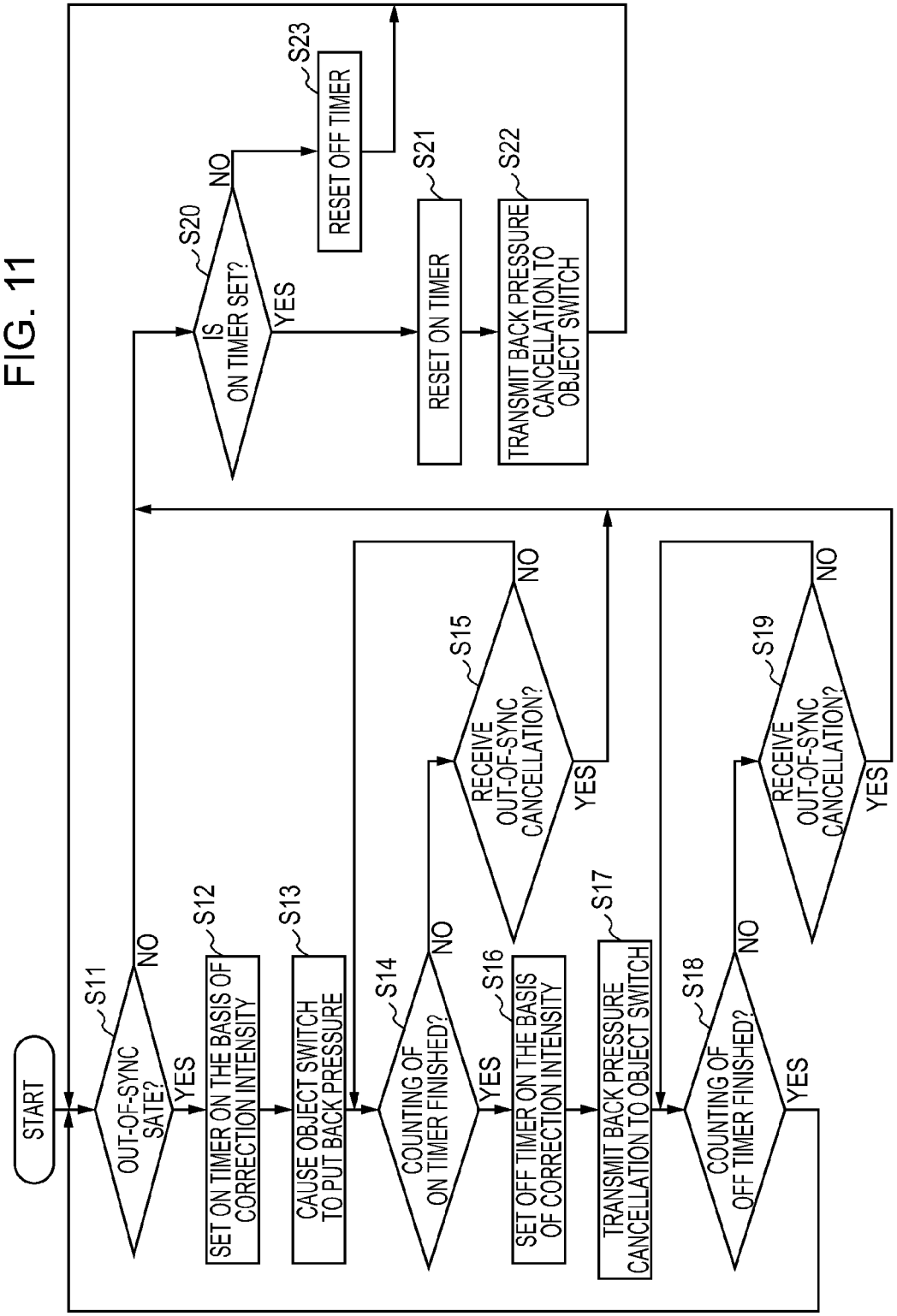
FIG. 11 is a diagram illustrating an example of an operational flowchart performed by a control unit, according to an embodiment.

FIG. 11 is a diagram illustrating an example of an operational flowchart performed by a control unit, according to an embodiment. The control unit 45 performs the following operations for each of classes.

In operation S11, the control unit 45 checks whether, for an object class, information on the out-of-sync state have been notified from the comparison unit 41 along with information on an object switch. When information on the out-of-sync state has been notified along with information on the object switch (YES in operation S11), the process proceeds to operation S12.

In operation S12, the control unit 45 calculates a setting value of the ON timer on the basis of correction intensity notified from the correction intensity determination unit 44, and sets the ON timer at the calculated setting value.

In operation S13, the control unit 45 causes the object switch to put back pressure on the control class so that the object switch stops packet-readout processing of reading out packets of the control class.

In operation S14, the control unit 45 determines whether counting of the ON timer is finished or not. When counting of the ON timer is not finished yet (NO in operation S14), the control unit 45 determines whether or not notice of out-of-sync cancellation has been received from the comparison unit 41 (in operation S15). When the control unit 45 has not received the notice of out-of-sync cancellation (NO in operation S15), the control unit 45 stands by until counting of the ON timer is finished.

Meanwhile, when counting of the ON timer is finished (YES in operation S14), the control unit 45 calculates a setting value of the OFF timer on the basis of the correction intensity notified from the correction intensity determination unit 44, and set the OFF timer at the calculated setting value (in operation S16).

In operation S17, the control unit 45 cancels the processing of putting back pressure which has been done on the object switch, and resumes the packet-readout processing of reading out packets of the control class in the object switch.

In operation S18, the control unit 45 determines whether notice of out-of-sync cancellation has been received from the comparison unit 41 by the time at which counting of the OFF timer is finished (No in operation S18, and in operation S19). When the control unit 45 has not received the notice of out-of-sync cancellation, the control unit 45 stands by until counting of the OFF timer is finished (NO in operation S19).

When counting of the OFF timer is finished (YES in operation S18), the control unit 45 returns to step S11 to check whether the out-of-sync state is continuing. When cancellation of the out-of-sync sate is not notified from the comparison unit 41 yet, the control unit 45 determines that the out-of-sync state is continuing and repeats the processing from step S12 to S19.

In a case where the control unit 45 receives the out-of-sync cancellation before counting of the ON timer is finished (YES in operation S15), synchronization is established during the processing of the control unit 45. Similarly, in a case where the control unit 45 receives the out-of-sync cancellation before counting of the OFF timer is finished (YES in operation S19), synchronization is established during the processing of the control unit 45.

When synchronization is thus established during the processing of the control unit 45, the control unit 45 checks whether the ON timer is set (in operation S20). When the ON timer is set (YES in operation S20), the control unit 45 resets the ON timer (in operation S21) and cancels the back pressure that has been put on the object switch (in operation S22). Thus, the control unit 45 resumes the packet-readout processing of reading out packets of the control class in the object switch. On the other hand, when the ON timer is not set (NO in operation S20), the control unit 45 resets the OFF timer and returns to operation S11.

When the control unit 45 has never notified of an out-of-sync state from the comparison unit 41 or when the control unit 45 has not been notified of the out-of-sync state after being notified of synchronization establishment (NO in operation S11), the control unit 45 determines that there exists no out-of-sync state. Then, the control unit 45 performs the operations from S20 to S23.

As mentioned above, the relay device 10 calculates the amount of data that is relayed for each of classes of packets and puts back pressure by using correction intensity corresponding to an average rate. Therefore, the relay device 10 may effectively establish synchronization even in a case where switching of a low-priority class among a plurality of classes is in an out-of-sync state. Accordingly, even when the switch circuits 30 are switched to avoid instantaneous interruption in an occurrence of a failure or the like in the relay device 10, loss or duplication of a packet may be avoided in the relay destination.

<Second Embodiment>

In a second embodiment, magnitude of difference between sequence numbers is used for determining correction intensity. The comparison unit 41 notifies the correction intensity determination unit 44 of a control class and difference between sequence numbers together with an out-of-sync state. The correction intensity determination unit 44 determines correction intensity by using an average rate of data of the control class and magnitude of difference between sequence numbers.

The correction intensity determination unit 44 determines correction intensity so that as the difference between sequence numbers is increased, the correction intensity is increased. Further, the correction intensity determination unit 44 determines correction intensity so that the correction intensity is increased as a ratio of data amount of the control class to the amount of relayed data is decreased.

FIG. 12 is a diagram illustrating an example of a table held by a correction intensity determination unit, according to a second embodiment. The table of FIG. 12 is an example, and magnitude of a difference value that is used as a threshold value in determination of correction intensity and a value of an average rate of the control class may be arbitrarily changed depending on implementation.

A method by which the correction intensity determination unit 44 determines correction intensity using the table depicted as FIG. 12 will be described. The correction intensity determination unit 44 sets, as a candidate for correction intensity, a value recorded in a column corresponding to the difference between sequence numbers that is notified from the comparison unit 41. Further, the correction intensity determination unit 44 inquires an average rate of the control class from the rate monitoring unit 43. On the basis of the value set as the candidate of the correction intensity, the correction intensity determination unit 44 determines correction intensity associated with the average rate that is notified from the rate monitoring unit 43 as a value to be used for control. For example, when the control class is a low-priority class and difference between sequence numbers is "3", the correction intensity determination unit 44 refers to the table of FIG. 12, and sets correction intensity of a case where difference between sequence numbers is 6 or less, as a candidate. That is, the correction intensity determination unit 44 recognizes that there is a possibility to set correction intensity to 10% correction or 50% correction. Then, when the correction intensity determination unit 44 is notified that data amount of the low-priority class accounts for 80% of the whole relayed data, from the rate monitoring unit 43, the correction intensity determination unit 44 determines the correction intensity to be 10%.

That is, the correction intensity determination unit 44 determines the correction intensity to be a value that is specified by using, as keys, the difference between sequence numbers and the average rate of data of the control class.

The correction intensity determination unit 44 notifies the control unit 45 of the determined correction intensity. Processing performed thereafter is the same as that of the first embodiment.

Figure 13:
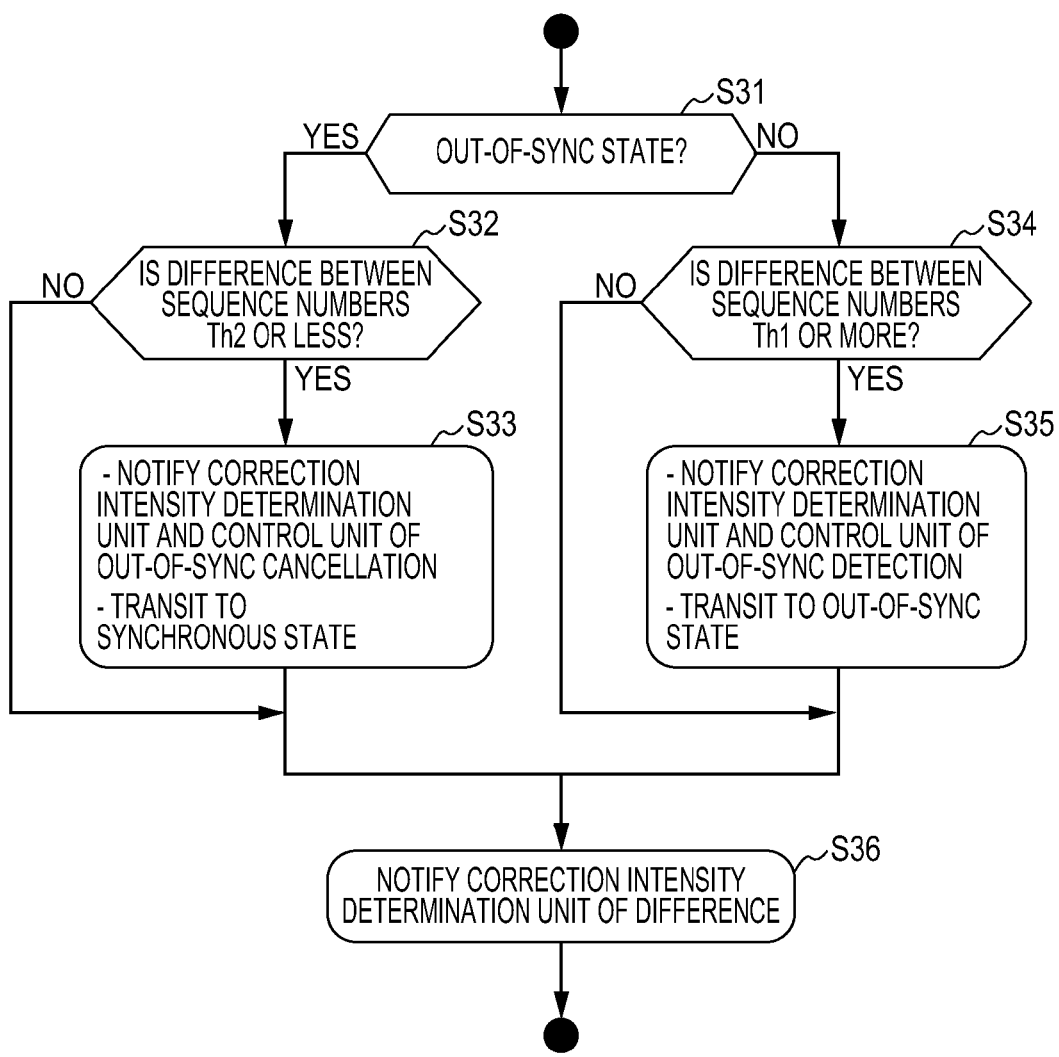
FIG. 13 is a diagram illustrating an example of an operational flowchart performed by a comparison unit, according to a second embodiment.

FIG. 13 is a diagram illustrating an example of an operational flowchart performed by a comparison unit, according to a second embodiment.

Operations S31 to S35 are the same as operations S1 to S5 that have been described with reference to FIG. 10.

In operation S36, after the processing of operation S33 is finished, the comparison unit 41 notifies the correction intensity determination unit 44 of difference between sequence numbers. The processing of operation S36 is also performed after the processing of operation S35 is performed. That is, the comparison unit 41 notifies the correction intensity determination unit 44 of difference between sequence numbers both in a case where it is determined that the difference between sequence numbers is equal to or less than the threshold value Th2 in operation S32 and in a case where it is determined that the difference between sequence numbers is equal to or more than the threshold value Th1 in operation S34.

FIG. 13 illustrates only an example of an operation of the comparison unit 41 which may be modified in a variety of ways. For example, it is possible that the comparison unit 41 does not notify the correction intensity determination unit 44 of difference between sequence numbers when the comparison unit 41 determines that synchronization is established. In this case, the comparison unit 41 does not notify the correction intensity determination unit 44 of the difference between sequence numbers even after the processing of operation S33 is finished. Further, it is also possible that the comparison unit 41 does not notify the correction intensity determination unit 44 of the difference between sequence numbers when it is determined that the difference between sequence numbers is less than the threshold value Th1 in operation S34 (NO in operation S34).

As mentioned above, correction intensity is determined by using difference between sequence numbers in addition to an average rate of data of a control class, thereby enabling more detailed setting of correction intensity than the first embodiment. Accordingly, synchronization may be reestablished by more appropriate correction intensity than correction intensity that is set in the first embodiment, allowing synchronization to be quickly established.

<Other>

Embodiments of the present disclosure are not limited to the above-described embodiments but may be variously modified. Examples of modifications will be described below.

FIGS. 8 and 12 illustrate examples of the table included in the correction intensity determination unit 44, and values used as a threshold value in determination of correction intensity may be arbitrarily changed depending on implementation. Further, in FIGS. 8 and 12, correction intensity is determined by using one threshold value for each parameter, as an example, but a plurality of threshold values may be used for one parameter. For example, correction intensity may be determined by using three threshold values that are 50%, 75%, and 90% as average rates of data of a control class, as the following:

when the average rate of data of the control class is less than 50%, 70% correction is applied;

when the average rate of data of the control class is equal to or more than 50% and less than 75%, 40% correction is applied;

when the average rate of data of the control class is equal to or more than 75% and less than 90%, 20% correction is applied; and when the average rate of data of the control class is equal to or more than 90%, 10% correction is applied.

As for the difference between sequence numbers, in a similar manner, correction intensity may be determined also in accordance with a plurality of threshold values.

Further, correction intensity may be obtained using a calculating formula that is determined on the basis of an empirical rule. In this case, the correction intensity determination unit 44 preliminarily stores the calculating formula.

It is also possible that packets outputted from the switch circuit 30a and packets outputted from the switch circuit 30b are mixed in the comparison unit 41. In this case, each of the switch circuits 30 writes, in the intra-device header 54 of a packet, information identifying the switch circuit 30 that has performed the packet-switch processing on the packet. The packet confluence unit 42 identifies a packet on which the packet-switch processing has been performed by the switch circuit 30 that is in a standby state, using the intra-device header 54 included in the packet, and discards the identified packet.

When the switch circuits 30a and 30b fall into an out-of-sync state regarding packets of the highest-priority class, the highest-priority class becomes a control class. In this case, a ratio of data amount of the control class to the amount of relayed data is approximately 100%. Accordingly, it is also possible to modify the correction intensity determination unit 44 so that when the highest-priority class becomes the control class, an operation of the correction intensity determination unit 44 determines correction intensity by difference between sequence numbers without depending on a ratio of data amount of the control class.

Further, setting of the ON timer and the OFF timer is a multiple number of slot times in the above example, but the minimum unit of setting of these timers is arbitrarily selected depending on implementation. For example, the control unit 45 may set 1 µs for the ON timer and 9 µs for the OFF timer when correction intensity is 10%.

In the above mentioned examples, the rate monitoring unit 43 calculates a ratio of data amount of each class to the amount of data that is relayed during a predetermined time period, and the correction intensity determination unit 44 obtains correction intensity using the ratio of the data amount. However, this method is merely an example. When congestion occurs, the amount of data that is outputted from the packet confluence unit 42 to the packet output unit 46 reaches the maximum capacity of the packet output unit 46. Accordingly, in a congested state, a state in which a ratio of the amount of data that is transmitted/received by packets of the high-priority class is large indicates a state in which the absolute amount of data that is transmitted/received by packets of the high-priority class is large. Accordingly, the correction intensity determination unit 44 may determine correction intensity in accordance with the amount of data that is transmitted/received by packets of the high-priority class. That is, as the amount of data that is transmitted/received by packets of the high-priority class is increased, correction intensity is increased. In this case, the rate monitoring unit 43 measures the amount of data that is transmitted/received by packets of each class, and notifies the correction intensity determination unit 44 of the measured amount of data.

Further, in a congested state, a state in which a ratio of the amount of data that is transmitted/received by packets of the high-priority class is large indicates a state in which the amount of data that is transmitted/received by packets of the high-priority class in a predetermined time period (that is, transfer rate) is large. Accordingly, the correction intensity determination unit 44 may determine correction intensity in accordance with a transfer rate of packets of the high-priority class. That is, as the transfer rate of packets of the high-priority class is increased, correction intensity is increased. In this case, the rate monitoring unit 43 measures a transfer rate for each class so as to notify the correction intensity determination unit 44 of the measured transfer rate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for switching a packet, the apparatus comprising:
    an input interface configured to receive high-priority packets of a high-priority class and low-priority packets of a low-priority class;
    first and second switch circuits each configured to:
        receive the high-priority packets and the low-priority packets from the input interface,
        store the high-priority packets and the low-priority packets into first and second buffers, respectively, and
        perform packet-readout processing for reading out a packet from the first and second buffers to output the packet outside the first and second switch circuit, the packet-readout processing being performed on the first buffer on a priority basis, wherein one of the first and second switch circuits is in an active mode and the other one of the first and second switch circuits is in a standby mode;
    a packet output interface configured to output the packet that has been outputted from the one of the first and second switch circuits that is in the active mode; and
    a control circuit configured to control a packet-readout time during which the packet-readout processing for each of the first and second switch circuits is performed,
    wherein the control circuit is configured to monitor a data rate of the high-priority packets and control the first and second switch circuits to which back pressure is applied based on the first data rate of the high-priority packets, a first back pressure for stopping the packet-readout processing by a first period being applied when the data rate of the high-priority packets is greater than a specified value, and a second back pressure for stopping the packet-readout processing by a second period shorter than the first period being applied when the data rate of the high-priority packets is less than the specified value.

2. The apparatus of claim 1, further comprising:
    a correction intensity determination circuit configured to:
        determine a correction intensity used to calculate the back-pressure time so that the correction intensity becomes greater with increasing amount of data transmitted by the low-priority packets, wherein
    when the first switch circuit is in the active mode and the second switch is in a standby mode, the control circuit obtains the back-pressure time for the first switch circuit by multiplying a time period during which the packet-readout processing for the second switch circuit is being performed by the correction intensity determined by the correction intensity determination circuit.

3. The apparatus of claim 2, further comprising:
    a comparison circuit configured to compare, for each of the high-priority and low-priority classes, a phase of packets outputted from the first switch circuit and a phase of packets outputted from the second switch circuit, wherein
    the input interface includes a sequence number adding circuit to add a sequence number identifying a receiving order of the high-priority packets or the low-priority packets, to each of the high-priority packets or each of the low-priority packets, respectively;
    the input interface outputs the high-priority packets added with the sequence numbers and the low-priority packets added with the sequence numbers to both the first and second switch circuits;
    the comparison circuit obtains a difference between sequence numbers added to high-priority and low-priority packets that are outputted, at the same time, from the first and second switch circuits, respectively; and
    the comparison circuit determines that the first and second switch circuits are out of synchronization when the obtained difference is greater than a threshold value.

4. The apparatus of claim 3, wherein
    the comparison circuit notifies the correction intensity determination circuit that the first and second switch circuits are out of synchronization; and
    the correction intensity determination circuit determines the correction intensity so that the correction intensity becomes greater as the difference becomes greater.

5. A method for switching a packet, the method being performed by an apparatus including first and second switch circuits, one of the first and second switch circuits being in an active mode, the other one of the first and second switch circuits being in a standby mode, the method comprising:
    receiving high-priority packets of a high-priority class and low-priority packets of a low-priority class;
    storing, by each of the first and second switch circuits, the high-priority packets and the low-priority packets into first and second buffers, respectively;
    performing, by each of the first and second switch circuits, packet-readout processing for reading out a packet from the first and second buffers to output the packet outside the first and second switch circuits, the packet-readout processing being performed on the first buffer on a priority basis;
    outputting the packet that has been outputted from one of the first and second switch circuits that is in the active mode;
    controlling a packet-readout time during which the packet-readout processing for each of the first and second switch circuits is performed;
    monitoring a data rate of the high-priority packets; and
    controlling the first and second switch circuits to which back pressure is applied based on the data rate of the high priority packets, a first back pressure for stopping the packet-readout processing by a first period being applied when the data rate of the high-priority packets is greater than a specified value, and a second back pressure for stopping the packet-readout processing by a second period shorter than the first period being applied when the data rate of the high-priority packets is less than the specified value.

6. The apparatus of claim 1, further comprising:

a comparison circuit configured to compare, for each of the high-priority and low-priority classes, a phase of packets outputted from the first switch circuit and a phase of packets outputted from the second switch circuit, wherein the input interface includes a sequence number adding circuit to add a sequence number identifying a receiving order of the high-priority packets or the low-priority packets, to each of the high-priority packets or each of the low-priority packets, respectively;

the input interface outputs the high-priority packets added with the sequence numbers and the low-priority packets added with the sequence numbers to both the first and second switch circuits;

the comparison circuit obtains a difference between sequence numbers added to high-priority and low-priority packets that are outputted, at the same time, from the first and second switch circuits, respectively; and the comparison circuit determines that the first and second switch circuits are out of synchronization when the obtained difference is greater than a threshold value.

* * * * *